United States Patent
Venkatachalam

(10) Patent No.: US 7,852,794 B2
(45) Date of Patent: Dec. 14, 2010

(54) PROXY IGMP CLIENT AND METHOD FOR PROVIDING MULTICAST BROADCAST SERVICES IN A BROADBAND WIRELESS ACCESS NETWORK

(75) Inventor: Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 997 days.

(21) Appl. No.: 11/625,451

(22) Filed: Jan. 22, 2007

(65) Prior Publication Data

US 2008/0175238 A1 Jul. 24, 2008

(51) Int. Cl.
*H04H 20/71* (2008.01)
*H04W 36/00* (2009.01)
*H04W 4/00* (2009.01)

(52) U.S. Cl. .................. 370/312; 370/331; 370/338; 455/436; 455/437; 455/438; 455/439

(58) Field of Classification Search ................. 370/312, 370/328, 331, 338, 390; 455/436, 437, 438, 455/439
See application file for complete search history.

(56) References Cited

U.S. PATENT DOCUMENTS

2006/0002391 A1* 1/2006 Takihiro et al. ............. 370/390

| | | | |
|---|---|---|---|
| 2006/0007930 A1 | 1/2006 | Dorenbosch | |
| 2006/0050659 A1 | 3/2006 | Corson et al. | |
| 2006/0072532 A1 | 4/2006 | Dorenbosch et al. | |
| 2008/0107110 A1* | 5/2008 | Andou et al. | 370/390 |
| 2009/0154386 A1* | 6/2009 | So et al. | 370/311 |

FOREIGN PATENT DOCUMENTS

WO  WO-2008091899 A1  7/2008

OTHER PUBLICATIONS

"International Application Serial No. PCT/US2008/051714, Search Report mailed Jun. 26, 2008", 6 Pgs.
"International Application Serial No. PCT/US2008/051714, Written Opinion mailed Jun. 26, 2008", 3 pgs.
Sun-Mi, J., et al., "IGMP Proxy for Multicast Services in Wireless Mobile Networks", *Vehicular Technology Conference,2005, VTC 2005-Spring.2005 IEEE 61st,* May 30-Jun. 1, 2005. vol. 5, 2855-2858.

* cited by examiner

*Primary Examiner*—Un C Cho
(74) *Attorney, Agent, or Firm*—Schwegman, Lundberg & Woessner, P.A.; Gregory J. Gorrie

(57) ABSTRACT

Embodiments of a proxy internet group management protocol (IGMP) client and methods for providing multicast broadcast services (MBS) in a broadband wireless access network are generally described herein. Other embodiments may be described and claimed. In some embodiments, the proxy IGMP client operates on behalf of a non-IGMP compliant mobile station to allow the mobile station to receive MBS from an IGMP network.

28 Claims, 5 Drawing Sheets

PROCEDURE ILLUSTRATING A MOBILE STATION JOINING A MULTICAST SESSION

FIG. 2 PROCEDURE ILLUSTRATING A MOBILE STATION JOINING A MULTICAST SESSION

CSN-ANCHORED HANDOVER

PROXY IGMP CLIENT AND METHOD FOR PROVIDING MULTICAST BROADCAST SERVICES IN A BROADBAND WIRELESS ACCESS NETWORK

TECHNICAL FIELD

The present invention pertains to wireless communications. Some embodiments relate to broadband wireless access (BWA) networks, such as a Worldwide Interoperability for Microwave Access (WiMax) network. Some embodiments relate to the transmission of multicast broadcast data in wireless access networks. Some embodiments relate to internet protocol (IP) multicasting and the internet group management protocol (IGMP).

BACKGROUND

In many networks, broadcast content may be IP multicasted using the IGMP. To receive broadcast content, the subscriber device generally needs to be IGMP compliant. This is not a problem for many personal and portable computers operating on wireline networks because these devices are generally IGMP compliant. In many wireless networks, wireless handsets and wireless terminals, such as WiMax terminals, generally are not IGMP compliant because of the additional cost, complexity, and/or processing requirements for IGMP. As a result, many wireless devices are unable to receive multicast broadcast content from an IGMP network.

Thus, there are general needs for methods that allow a non-IGMP compliant wireless device to receive IP based multicast broadcast services from an IGMP network.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
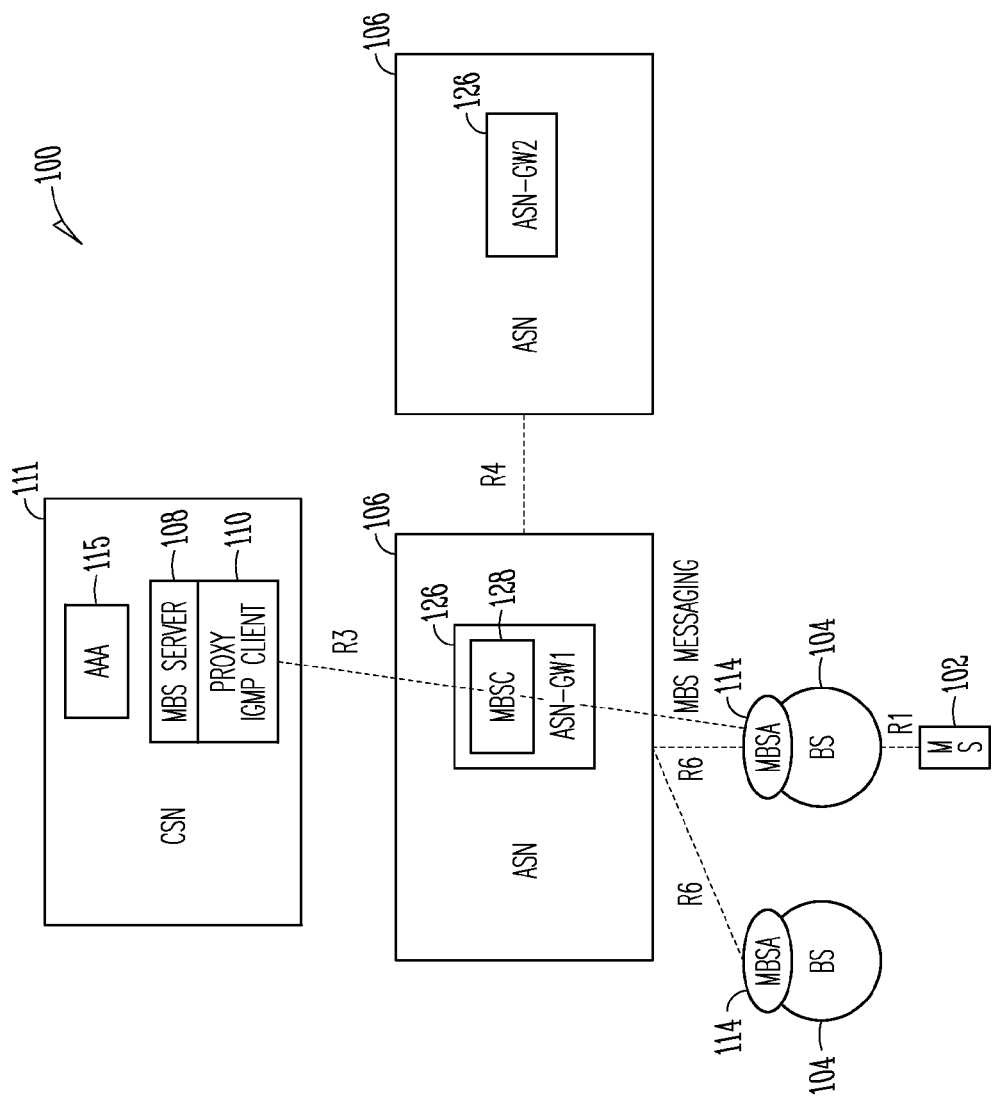
FIG. 1 illustrates a wireless access network in accordance with some embodiments of the present invention.

FIG. 1 illustrates a wireless network in accordance with some embodiments of the present invention. Wireless access network 100 comprises CSN 111 and one or more ASNs 106. Among other things, wireless access network 100 may receive content from one or more content servers and may provide the content to one or more mobile stations (MS) 102. Each ASN 106 may include one or more ASN gateways (ASN-GW) 126, illustrated as ASN-GW1 and ASN-GW2, and a plurality of base stations (BS) 104. CSN 111 may include authentication authorization accounting (AAA) server 115 which, among other things, may handle requests for access discussed in more detail below. In some embodiments, AAA server 115 of CSN 111 may include a policy function (PF) to authorize mobile stations 102 to receive multicast broadcast services.

In accordance with embodiments, some of ASN-GWs 126 may include a multicast broadcast service controller (MBSC) 128. Each MBSC 128 may create one or more multicast broadcast service (MBS) zones which may comprise one or more base stations 104. In some embodiments, MBSC 128 may create MBS zones by establishing specific time and frequency parameters for simultaneous multicast downlink transmissions to mobile stations 102 within a particular MBS zone. In these embodiments, base stations 104 may include MBS agents (MBSA) 114 to cause and/or instruct base stations 104 to synchronously transmit identical content within MBS regions of downlink subframes. The identical MBS regions may include multicast broadcast content identified by multicast connection identifiers (CIDs).

In some embodiments, wireless network 100 may be a single-frequency network (SFN) in which each base station 104 in an MBS group transmits the same information with an MBS zone. In these embodiments, the data transmitted by base stations of an MBS group may be time and frequency and content-wise synchronized, although the scope of the inventions is not limited in this respect. In these embodiments, a handover does not need to be performed when a mobile station moves from one base station to another. Handovers are discussed in more detail below.

In some other embodiments, wireless access network 100 may be a non-SFN network in which the data transmitted by base stations of an MBS group are not time and/or frequency and/or content-wise synchronized. In these embodiments, a handover is performed when a mobile station moves from one base station to another. Handovers are discussed in more detail below. In some embodiments, ASNs 106 may operate as either a SFN or a non-SFN network within wireless access network 100.

In accordance with some embodiments of the present invention, wireless network 100 may include MBS server 108 and proxy IGMP client 110. In these embodiments, mobile stations, such as mobile station 102, may receive the benefits of IGMP without having to be IGMP compliant. In these embodiments, proxy IGMP client 110, in conjunction with MBS server 108, acts as a proxy on behalf of a mobile station allowing a non-IGMP compliant mobile station to receive MBS services from an IGMP network. In these embodiments, additional airlink resources (i.e., bandwidth) are not needed for IGMP signaling. These embodiments are discussed in more detail below.

In some embodiments, proxy IGMP client 110 may reside in MBS server 108 as shown in FIG. 1, although the scope of the invention is not limited in this respect. In some embodiments, proxy IGMP client 110 may reside elsewhere in the network, such as in one of ASNs 106. In some embodiments, first ASN-GW 126 may have an R3 interface with CSN 111, and each ASN-GW 126 may have an R4 interface with other ASN-GWs 126. In these embodiments, first ASN-GW 126 may also have an R6 interface with each base station 104, and base stations 104 may have an R1 interface with mobile station 102, although the scope of the invention is not limited in this respect.

In some embodiments, mobile station 102 may comprise a portable wireless communication device, such as portable base station, a personal digital assistant (PDA), a laptop or portable computer with wireless communication capability, a web tablet, a wireless telephone, a wireless headset, an instant messaging device, a digital camera, an access point, a television, a medical device (e.g., a heart rate monitor, a blood pressure monitor, etc.), or other device that may receive and/or transmit information wirelessly.

In some embodiments, ASNs 106 may be part of a BWA network, such as a WiMax network. In these embodiments, base stations 104 and mobile station 102 may communicate using a multiple access technique, such as orthogonal frequency division multiple access (OFDMA), although the scope of the invention is not limited in this respect. In some of these embodiments, mobile station 102 may be a WiMax terminal.

In some embodiments, base stations 104 and mobile station 102 may communicate in accordance with specific communication standards, such as the Institute of Electrical and Electronics Engineers (IEEE) standards including the IEEE 802.16-2004 and/or IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

Figure 2:
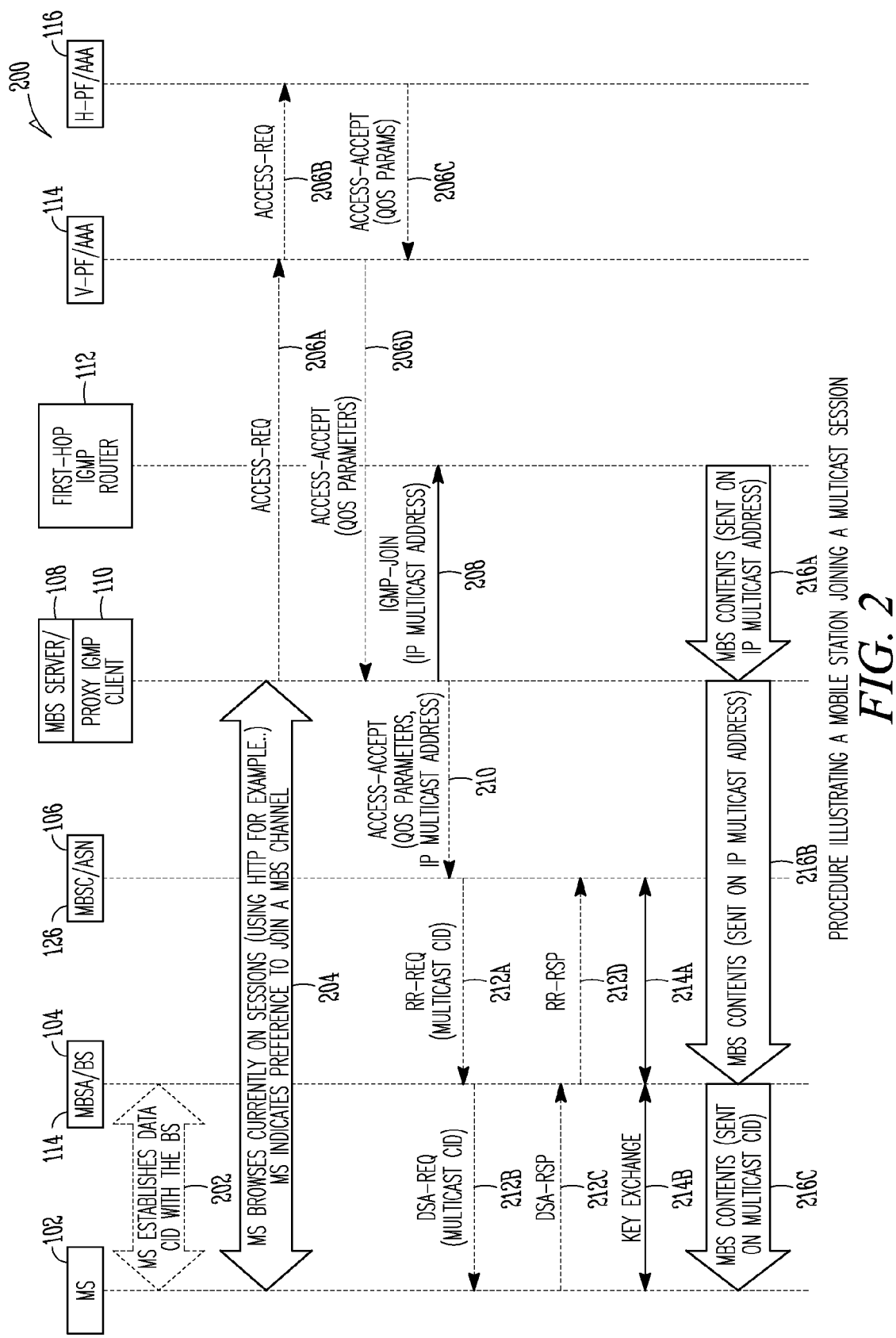
FIG. 2 is a procedure illustrating a mobile station joining a multicast session in accordance with some embodiments of the present invention.

FIG. 2 is a procedure illustrating a mobile station joining a multicast session in accordance with some embodiments of the present invention. Procedure 200 may be performed by various elements of a wireless access network, such as network 100 (FIG. 1) to provide a non-IGMP compliant mobile station, such as mobile station 102, with a requested broadcast channel using IP multicast broadcasting.

In operations 202, a CID may be established between base station 104 within ASN 106 and mobile station 102. As part of operation 202, mobile station 102 is provided either an IP address or a uniform resource identifier (URI) of MBS server 108 during either a provisioning phase or a sign-on phase when the CID is established, although the scope of the invention is not limited in this respect.

In operations 204, a request to join a multicast session may be received from non-IGMP compliant mobile station, such as mobile station 102, at MBS server 108. The request may indicate the multicast-broadcast channel that the MS may wish to join. In response to the request, an access authorization procedure may be performed, illustrated by operations 206A through 206D described in more detail below.

In these embodiments, when the requested broadcast channel is not currently being provided (i.e., not being multicasted) within ASN 106 of mobile station 102, operations 208 are performed. In operation 208, an IGMP-join message is sent from proxy IGMP client 110 to first-hop IGMP router 112 on behalf of mobile station 102 indicating the multicast IP address of the requested broadcast channel.

In these embodiments, when the requested broadcast channel is currently being provided within ASN 106 serving mobile station 102, operations 208 do not need to be performed. In these embodiments, proxy IGMP client 110 may refrain from sending the IGMP-join message and may cause MBS server 108 to trigger the establishment of MBS service for the requested broadcast channel within ASN 106 on a downlink to mobile station 102. In these embodiments, MBS server 108 through the use of proxy IGMP client 110 operating on behalf of mobile station 102 allows mobile station 102 to receive MBS from an IGMP network.

When the requested broadcast channel is not currently being provided within ASN 106, and when first-hop IGMP router 112 is not currently providing the requested broadcast channel to one or more other ASNs, first-hop IGMP router 112 forwards the IGMP-join message upstream to one or more other IGMP routers (not illustrated) or to a content source (not illustrated) to request content comprising the requested broadcast channel. In this way, the IGMP join message will reach either an IGMP router that is currently providing the requested content or the content source.

In some embodiments, when the requested broadcast channel is currently being provided within ASN 106, an existing multicast CID may be currently being used to provide the requested broadcast channel to one or more base stations, such as base station 104, being serviced by ASN 106. In these embodiments, operations 210 may be performed. In operations 210, MBS server 108 may establish MBS service for the requested broadcast channel by instructing ASN 106 to issue a radio-resource request (RR-REQ) per operation 212A to base station 104 currently serving mobile station 102. This will allow base station 104 to provide the requested broadcast channel to mobile station 102 using the existing multicast CID.

As illustrated in FIG. 2, in response to the RR-REQ of operation 212A, base station 104 may provide a dynamic service addition request (DSA-REQ) message to mobile station 102 in operation 212B, mobile station 102 may respond with a DSA response (DSA-RSP) message in operation 212C, and base station 104 may respond with an RR-RSP message in operation 212D. Accordingly downlink bandwidth may be allocated to allow mobile station 102 to receive the requested broadcast channel. In these situations, mobile station 102 may receive the requested broadcast channel from base station 104 on the existing multicast CID.

In some embodiments, when the requested broadcast channel is not currently being provided within ASN 106, operation 210 may comprise instructing ASN 106 to establish a new multicast CID and to issue a radio-resource request (RR-REQ) per operation 212A to base station 104 currently serving mobile station 102 to provide the requested broadcast channel to the mobile station using the new multicast CID. In these embodiments, the requested broadcast channel may be received on the IP multicast address by MBS server 108 in operation 216A from first-hop IGMP router 112 in response to the IGMP-join message sent in operation 208. In these embodiments, MBS server 108 may route the content comprising requested broadcast channel to ASN 106 for receipt by base station 104 in operation 216B using the IP multicast address. Mobile station 102 may then receive the requested broadcast channel from base station 104 in operation 216 on the new multicast CID previously established by ASN 106 for the requested broadcast channel.

In some embodiments, in response to the request to join the multicast session from non-IGMP compliant mobile station 102 received in operations 204, operations 206A through 206D may be performed. In operation 206A, an access request (access-REQ) message may be sent from MBS server 108 to an AAA server. The access request message may indicate the identity of mobile station 102 and may indicate the requested broadcast channel. An access acceptance message may be received from the AAA server in operation 206D in response to the access request. The IGMP join message may be responsively sent to first-hop IGMP router 112 in operation 208 for the establishment of the MBS service for the requested broadcast channel within ASN 106. In these embodiments, MBS server 108 may request and receive approval to provide the requested broadcast channel to mobile station 102. As illustrated in FIG. 2, the access request of operation 206A may originally be received at visitor policy-function and authentication authorization accounting (V-PF/AAA) server 114 when the MS is in the roaming mode in a visited network. The request may then be routed to H-PF/AAA server 116, by V-PF/AAA server 114 as shown by operation 206B. An access acceptance message may be sent from H-PF/AAA server 116 to V-PF/AAA server 114 in operation 206C, which may be sent by V-PF/AAA 114 to MBS server 108.

In some embodiments, the access acceptance received in operation 206D may include quality-of-service (QoS) parameters associated with the content of the requested broadcast channel and/or associated with mobile station 102. In these embodiments, the QoS parameters may be provided to ASN 106 as part of an access acceptance message forwarded from MBS server 108 to ASN 106 in operations 210 for establishing a new MBS service flow. In some of these embodiments, the particular broadcast channels available as well as the QoS parameters may depend on a level of service paid for by the subscriber (i.e., user of mobile station 102), although the scope of the invention is not limited in this respect.

In some embodiments, ASN 106 performs a key exchange process, illustrated by in operations 214A and 214B, to establish one or more encryption keys to allow mobile station 102 to securely receive and/or decrypt the requested broadcast channel using either the new or the existing multicast CID in operation 216C.

In some embodiments, as part of operations 204, mobile station 102 may use an application layer protocol, such as the hypertext transfer protocol (HTTP), to browse a directory of currently available multicast sessions, although the scope of the invention is not limited in this respect. In some embodiments, the directory may be provided by or stored on MBS server 108. In some embodiments, a predetermined web site or portal may be used by mobile station 102 to view a listing of currently available broadcast channels. Broadcast channels, as used herein, may include video and audio channels, although the scope of the invention is not limited in this respect. In some embodiments, MBS server 108 may receive multicast content from a multicast source that may be accessible by the internet or within an operator's network. In some embodiments, MBS server 108 may listen to internet multicast announcements on a multicast announcement channel. In some embodiments, MBS server 108 may have pre-configured MBS listings from a network operator. In some embodiments, MBS server 108 may cache information in the directory regarding multicast sessions presently being broadcasted including information about the content owner, the session duration, start/stop times of the sessions, etc.

In some embodiments, mobile station 102 may use session description protocol (SDP) primitives as an alternate to an application layer protocol (such as HTTP) to connect and communicate with MBS server 108 and/or to browse contents of a directory of currently available multicast sessions, although the scope of the invention is not limited in this respect. These SDP primitives may be used during operations 204.

In some embodiments, a notification may be received from mobile station 102 when mobile station 102 powers down or requests either to terminate the multicast session or to join a different multicast session. In these embodiments, in response to the notification from mobile station 102, ASN 106 may terminate the use a connection ID when no other mobile stations are receiving the broadcast content freeing up bandwidth. In some embodiments, media-access control (MAC) type messages may be used when the mobile station powers down or terminates the multicast session. In these embodiments, keep-alive messages, such as those used by the IGMP, are not required to determine whether or not a mobile station is currently receiving content. This may significantly reduce the bandwidth needed to provide MBS services to mobile stations.

Figure 3:
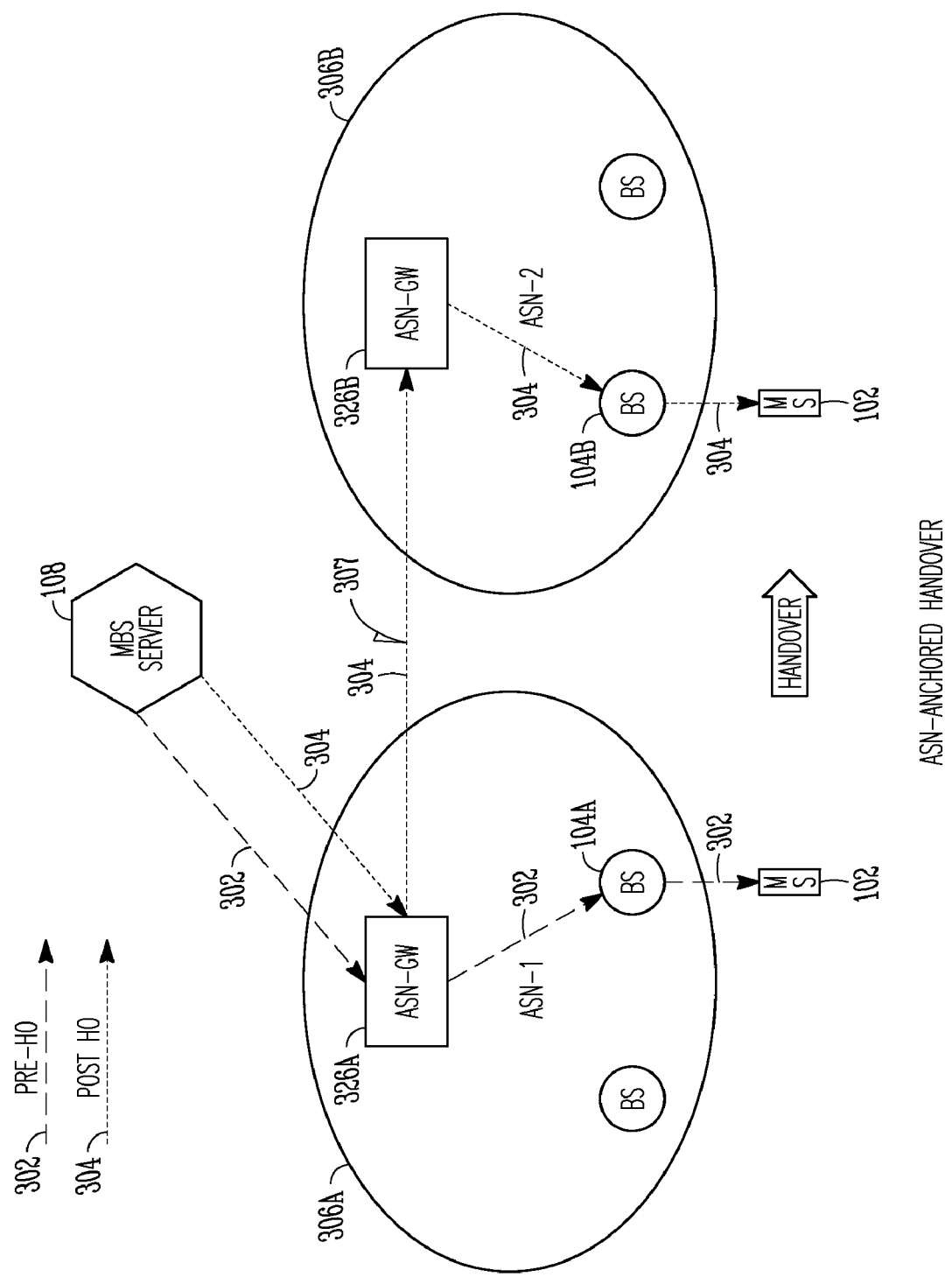
FIG. 3 illustrates an access service network (ASN) anchored handover in accordance with some embodiments of the present invention.

FIG. 3 illustrates an ASN anchored handover in accordance with some embodiments of the present invention. In these embodiments, an ASN-anchored handover may be performed to handover mobile station 102 from base station 104A in ASN 306A to base station 104B in ASN 306B. Prior to the ASN-anchored handover, the broadcast channel may be provided to mobile station 102 using pre-handover data path 302. After the ASN-anchored handover, the broadcasted channel may be provided to mobile station 102 using post-handover data path 304. In these embodiments, MBS server 108 may be unaware of the handover between ASN 306A and ASN 306B. In some of these embodiments, post-handover data path 304 may include temporarily extended data path 307, which may be established between ASN-GW 326A and ASN-GW 326B. This is discussed in more detail below.

In some embodiments, when mobile station 102 is handed over from first base station 304A within first ASN 306A to second base station 304B within second ASN 306B, temporarily extended data path 307 may be provided for the broadcast channel currently being received by mobile station 102 from first ASN 306A to second ASN 306B. In some embodiments, a tunneling technique may be used to allow mobile station 102 to, at least temporarily, receive the broadcast channel from second base station 304B within second ASN 306B. In these embodiments, the broadcast channel from second base station 304B using a same multicast CID used within first ASN 306A, although the scope of the invention is not limited in this respect.

In these embodiments, temporarily extended data path 307 may be provided when second ASN 306B is not providing the broadcast channel to base stations therein. In these embodiments, first ASN 306A and second ASN 306B may exchange information during the handover process to determine whether the broadcast channel is being provided with second ASN 306B and whether to temporarily extend the data path. In some of these embodiments, first ASN 306A may establish a tunnel to second ASN 106B to allow packets comprising the broadcast channel to be encapsulated and securely communicated, although the scope of the invention is not limited in this respect. In these embodiments, temporarily extended data path 307 may be provided until a data path for the broadcast channel is established directly between MBS server 108 and second ASN 306B. The subsequent establishment of a data path directly between MBS server 108 and second ASN 306B is discussed below.

For handovers between base stations of a common ASN, MBS server 108 does not need to be notified and the common ASN may instruct the new base station to provide the broadcast channel to mobile station 102 using the same multicast CID used by the initial base station. When the common ASN is operating as a SFN, discussed above, a handover does not need to be performed when a mobile station moves from one base station to another. When the common ASN is operating as a non-SFN, discussed above, a handover between base stations is performed when a mobile station moves from one base station to another.

In some embodiments, first ASN-GW 326A may refrain from temporarily extending the data path when second ASN 306B is currently providing the broadcast channel. In these embodiments, the broadcast channel may be provided to mobile station 102 on a multicast CID currently being used for the broadcast channel by second ASN 306B. In these embodiments, mobile station 102 may be notified of the multicast CID currently being used for the broadcast channel by second ASN 306B during the handover procedure, although the scope of the invention is not limited in this respect.

Figure 4:
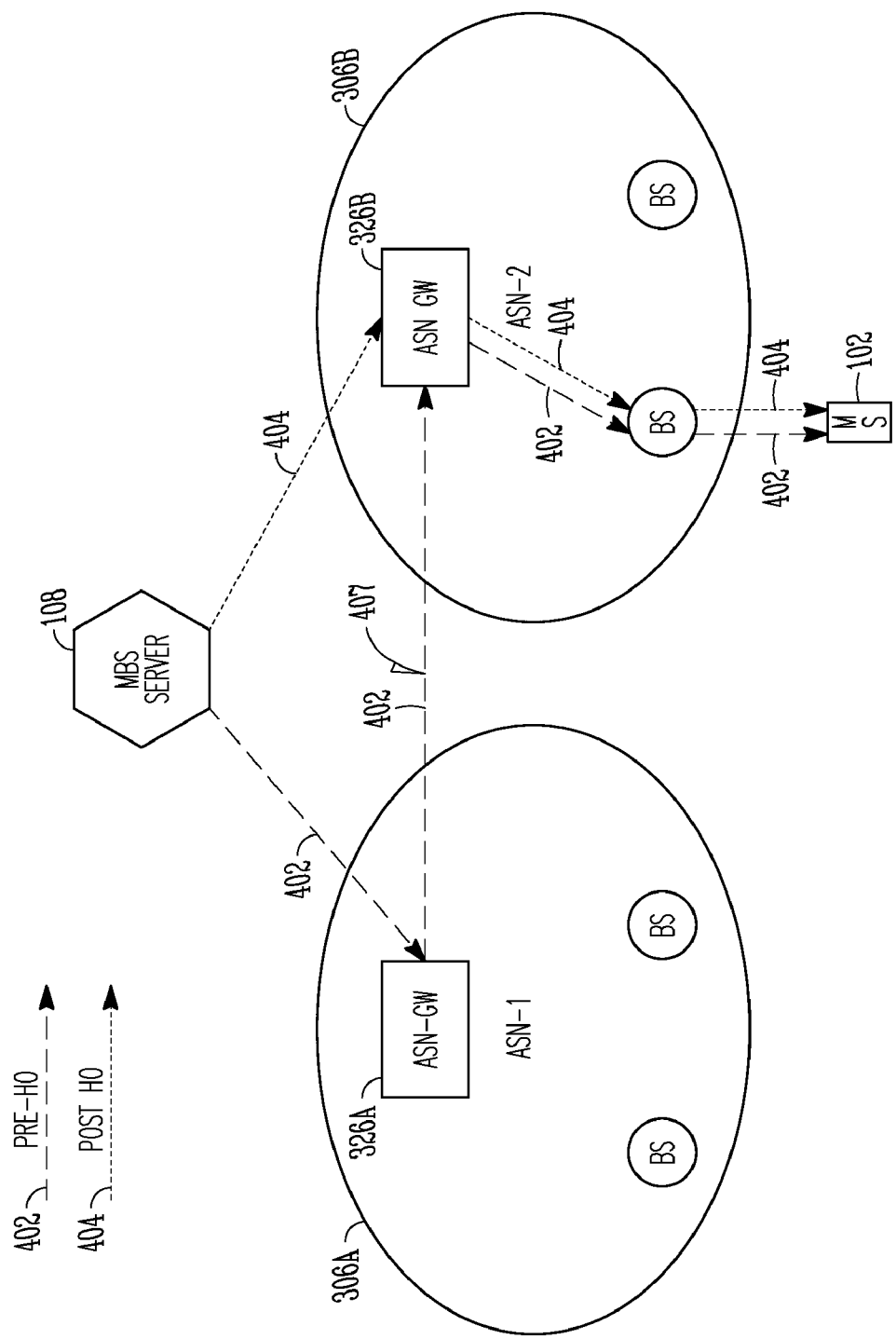
FIG. 4 illustrates a core service network (CSN) anchored handover in accordance with some embodiments of the present invention.

FIG. 4 illustrates a CSN-anchored handover in accordance with some embodiments of the present invention. In these embodiments, a CSN-anchored handover illustrated in FIG. 4 may be performed to handover communications from MBS server 108 between first ASN 306A and second ASN 306B after the ASN-anchored handover illustrated in FIG. 3 is performed. In some embodiments, the CSN-anchored handover illustrated in FIG. 4 may remove temporarily extended data path 307 (FIG. 3) so that the broadcast channel may be provided directly from MBS server 108 to ASN 306B.

Prior to the CSN-anchored handover, the broadcasted channel may be provided to mobile station 102 using pre-handover data path 402. After the CSN-anchored handover, the broadcasted channel may be provided to mobile station 102 using post-handover data path 404. In some of these embodiments, pre-handover data path 402 may include temporarily extended data path 407 established between ASN-GW 326A and ASN-GW 326B. In these embodiments, post-handover data path 304 (FIG. 3) may correspond to pre-handover data path 402, and temporarily extended data path 307 (FIG. 3) may correspond to temporarily extended data path 407.

Figure 5:
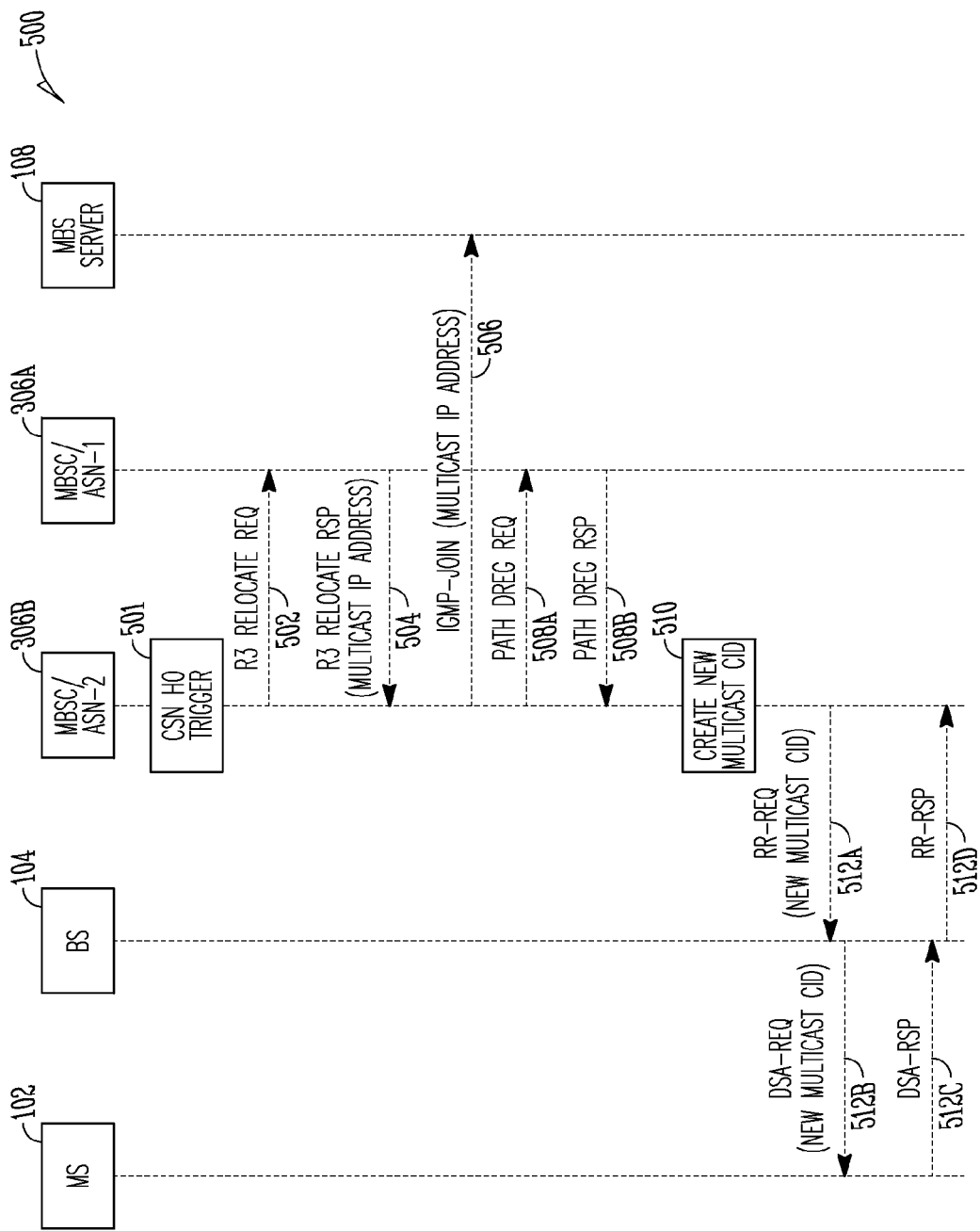
FIG. 5 is a CSN-anchored handover procedure in accordance with some embodiments of the present invention.

FIG. 5 is a CSN-anchored handover procedure in accordance with some embodiments of the present invention. Procedure 500 may be performed to implement the CSN-anchored handover illustrated in FIG. 4. In some embodiments, in operation 502, a relocation request message may be sent from second ASN 306B to first ASN 306A. The relocation request message may be triggered by the CSN in operation 501, although the scope of the invention is not limited in this respect. A relocation response message may be received from first ASN 306A in operation 504. The relocation response message may include the multicast IP address of the broadcast channel and may be sent to second ASN 306B in response to a relocation request message in operation 502.

In response to the relocation response message, second ASN 306B may send an IGMP-join message in operation 506 to MBS server 108 indicating the multicast IP address. This may allow second ASN 306B to receive the broadcast channel directly from the MBS server 108 and provide the broadcast channel to mobile station 102 through second ASN 306B. In these embodiments, second ASN 306B may create a new multicast CID in operation 510 for providing the broadcast channel to the mobile station and may terminate the temporarily extended data path in operations 508A and 508B. Operation 508A may include sending a path deregistration request (DREG REQ) message from ASN 306A. Operation 508B may include receiving a path deregistration response (DREG RSP) message from ASN 306A confirming the termination of temporarily extended data path 407 (FIG. 4).

Operations 512A through 512D may be performed to allocate bandwidth of base station 104 to mobile station 102 to allow mobile station 102 to receive the broadcast channel on the new multicast CID. Operations 512A through 512D may be similar to operations 212A through 212D (FIG. 2) respectively.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or nonvolatile memory or a combination thereof.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of providing multicast broadcast service (MBS) to a non-internet group management protocol (IGMP) compliant mobile station comprising:

receiving a request to join a multicast session from the mobile station at a MBS server, the request indicating a requested broadcast channel;

when the requested broadcast channel is not currently being provided within an access service network (ASN) of the mobile station, sending an IGMP-join message from a proxy IGMP client to a first hop IGMP router indicating a multicast IP address of the requested broadcast channel; and when the requested broadcast channel is currently being provided within the ASN, refraining from sending the IGMP join message and triggering establishment of MBS service for the requested broadcast channel for a base station currently serving the mobile station, wherein the MBS server operates the proxy IGMP client on behalf of the mobile station allowing the mobile station to receive MBS from an IGMP network.

2. The method of claim 1 wherein when the requested broadcast channel is not currently being provided within the ASN, and when the first hop IGMP router is not currently providing the requested broadcast channel, the first hop IGMP router forwards the IGMP join message upstream to one or more other IGMP routers or to a content source to request content comprising the requested broadcast channel.

3. The method of claim 1 wherein when the requested broadcast channel is currently being provided within the ASN, an existing multicast connection identifier (CID) is currently being used to provide the requested broadcast channel to one or more base stations being serviced by the ASN, and
    wherein the triggering the establishment of MBS service for the requested broadcast channel comprises instructing the ASN to issue a radio-resource request to the base station currently serving the mobile station to provide the requested broadcast channel to the mobile station using the existing multicast CID.

4. The method of claim 3 wherein when the requested broadcast channel is not currently being provided within the ASN, instructing the ASN to establish a new multicast CID and issue a radio-resource request to a base station currently serving the mobile station to provide the requested broadcast channel to the mobile station using the new multicast CID.

5. The method of claim 4 where in response to the request to join the multicast session from the mobile station, the method comprises:
    sending an access request message to an authentication authorization accounting server, the access request message indicating an identity of the mobile station and indicating the requested broadcast channel.

6. The method of claim 5 wherein the access acceptance includes quality-of-service (QoS) parameters associated with the requested broadcast channel and the mobile station, and
    wherein the method further comprises providing the QoS parameters to the ASN as part of an access acceptance message forwarded from the MBS server to the ASN for establishing a new service flow.

7. The method of claim 4 wherein the ASN performs a key exchange process to establish one or more encryption keys to allow the mobile station to securely receive the requested broadcast channel using either the new or the existing multicast CID.

8. The method of claim 1, wherein prior to receiving the request to join the multicast session from the mobile station, a connection identifier (CID) is established between a base station within the ASN and the mobile station, and
    wherein the mobile station is provided either an IP address or a uniform resource identifier of the MBS server during either a provisioning phase or a sign-on phase when the CID is established.

9. The method of claim 1 wherein the mobile station uses an application layer protocol to browse a directory of currently available multicast session, and
    wherein the directory is provided by the MBS server.

10. The method of claim 1 wherein the mobile station uses session description protocol primitives to connect to the MBS server and browse contents of a directory of currently available multicast sessions, and
    wherein the directory is provided by the MBS server.

11. The method of claim 1 wherein when the mobile station is handed over from a first base station within a first ASN to a second base station within a second ASN, the method further comprising:
    temporarily extending a data path for the broadcast channel currently being received by the mobile station from the first ASN to the second ASN using tunneling to allow the mobile station to receive the broadcast channel from the second base station within the second ASN using a same multicast connection identifier (CID) used within the first ASN,
    wherein the data path is temporarily extended when the second ASN is not providing the broadcast channel.

12. The method of claim 11 further comprising:
    refraining from temporarily extending the data path when the second ASN is currently providing the broadcast channel; and
    providing the broadcast channel to the mobile station on a multicast CID currently being used for the broadcast channel by the second ASN.

13. The method of claim 11 wherein after temporarily extending the data path, the method further comprises sending a relocation response message that includes the multicast IP address of the broadcast channel to the second ASN to the first ASN,
    wherein in response to the relocation response message, the second ASN sends and IGMP join message to the MBS server indicating the multicast IP address to allow the second ASN to receive the broadcast channel from the MBS server and provide the broadcast channel to the mobile station, and
    wherein the second ASN creates a new multicast CID for providing the broadcast channel to the mobile station and terminates the temporarily extended data path.

14. The method of claim 1 further comprising receiving a notification from the mobile station when the mobile station powers down or requests either to terminate the multicast session or to join a different multicast session.

15. The method of claim 1 wherein the mobile station is a non-IGMP compatible mobile station and does not use a network layer protocol to join an MBS session, and
    wherein the access service network is a broadband wireless access network and the mobile station comprises a BWA mobile station.

16. A broadband wireless access network comprising:
    a multicast broadcast server to provide multicast broadcast service (MBS) to a non-internet group management protocol (IGMP) compliant mobile station; and
    a proxy IGMP client to operate on behalf of the mobile station allowing the mobile station to receive MBS from an IGMP network,
    wherein when a requested broadcast channel is currently being provided within an access service network (ASN) of the mobile station, the proxy IGMP client refrains from sending an IGMP join message to an IGMP router and triggers establishment of MBS service for the requested broadcast channel for a base station currently serving the mobile station.

17. A broadband wireless access network comprising:
    a multicast broadcast server to provide multicast broadcast service (MBS) to a non-internet group management protocol (IGMP) compliant mobile station; and
    a proxy IGMP client to operate on behalf of the mobile station allowing the mobile station to receive MBS from an IGMP network,
    wherein the multicast broadcast server receives a request to join a multicast session from the mobile station, the request indicating a multicast Internet-Protocol (IP) address of a requested broadcast channel,
    wherein when the requested broadcast channel is not currently being provided within an access service network (ASN) of the mobile station, the proxy IGMP client sends an IGMP-join message to a first hop IGMP router indicating the multicast IP address of the requested broadcast channel, and
    wherein when the requested broadcast channel is currently being provided within the ASN, the proxy IGMP client refrains from sending the IGMP-join message and triggers establishment of MBS service for the requested broadcast channel for a base station currently serving the mobile station.

18. The network of claim 17 wherein when the requested broadcast channel is not currently being provided within the ASN, and when the first hop IGMP router is not currently providing the requested broadcast channel, the first hop IGMP router forwards the IGMP join message upstream to one or more other IGMP routers or to a content source to request content comprising the requested broadcast channel.

19. The network of claim 18 wherein when the requested broadcast channel is currently being provided within the ASN, an existing multicast connection identifier (CID) is currently being used to provide the requested broadcast channel to one or more base stations being serviced by the ASN,
wherein the proxy IGMP client triggers the establishment of MBS service for the requested broadcast channel by instructing the ASN to issue a radio-resource request to a base station currently serving the mobile station to provide the requested broadcast channel to the mobile station using the existing multicast CID, and
wherein when the requested broadcast channel is not currently being provided within the ASN, the proxy IGMP client instructs the ASN to establish a new multicast CID and issue a radio-resource request to the base station currently serving the mobile station to provide the requested broadcast channel to the mobile station using the new multicast CID.

20. The network of claim 17 wherein when the mobile station is handed over from a first base station within a first ASN to a second base station within a second ASN, the proxy IGMP client temporarily extends a data path for the broadcast channel currently being received by the mobile station from the first ASN to the second ASN using tunneling to allow the mobile station to receive the broadcast channel from the second base station within the second ASN using a same multicast connection identifier (CID) used within the first ASN,
wherein the data path is temporarily extended when the second ASN is not providing the broadcast channel, and
wherein the proxy IGMP client refrains from temporarily extending the data path when the second ASN is currently providing the broadcast channel, and the multicast broadcast server provides the broadcast channel to the mobile station on a multicast CID currently being used for the broadcast channel by the second ASN.

21. The network of claim 20 wherein after temporarily extending the data path, the multicast broadcast server sends a relocation response message that includes the multicast IP address of the broadcast channel to the second ASN to the first ASN,
wherein in response to the relocation response message, the second ASN sends and IGMP join message to the MBS server indicating the multicast IP address to allow the second ASN to receive the broadcast channel from the MBS server and provide the broadcast channel to the mobile station, and
wherein the second ASN creates a new multicast CID for providing the broadcast channel to the mobile station and terminates the temporarily extended data path.

22. The network of claim 17 wherein the proxy IGMP client resides in the ASN separate from the multicast broadcast server.

23. A proxy IGMP client to operate on behalf of a non-internet group management protocol (JUMP) compliant mobile station to allow the mobile station to receive multicast broadcast service (MBS) from an IGMP network,
wherein when a requested broadcast channel is currently being provided within an access service network (ASN) of the mobile station, the proxy IGMP client is to refrain from sending an IGMP-join message to an IGMP router and is to trigger establishment of the MBS service for the requested broadcast channel for a base station currently serving the mobile station.

24. A proxy IGMP client to operate on behalf of a non-internet group management protocol (IGMP) compliant mobile station to allow the mobile station to receive multicast broadcast service (MBS) from an IGMP network,
wherein a multicast broadcast server receives a request to join a multicast session from the mobile station, the request indicating a multicast Internet-Protocol (IP) address of a requested broadcast channel,
wherein when the requested broadcast channel is not currently being provided within an access service network (ASN) of the mobile station, the proxy IGMP client sends an IGMP join message to a first hop IGMP router indicating the multicast IP address of the requested broadcast channel, and
wherein when the requested broadcast channel is currently being provided within the ASN, the proxy IGMP client refrains from sending the IGMP-join message and triggers establishment of MBS service for the requested broadcast channel for a base station currently serving the mobile station.

25. The proxy IGMP client of claim 24 wherein when the requested broadcast channel is not currently being provided within the ASN, and when the first hop IGMP router is not currently providing the requested broadcast channel, the first hop IGMP router forwards the IGMP-join message upstream to one or more other IGMP routers or to a content source to request content comprising the requested broadcast channel.

26. The proxy IGMP client of claim 25 wherein when the requested broadcast channel is currently being provided within the ASN, an existing multicast connection identifier (CID) is currently being used to provide the requested broadcast channel to one or more base stations being serviced by the ASN,
wherein the proxy IGMP client triggers the establishment of MBS service for the requested broadcast channel by instructing the ASN to issue a radio-resource request to a base station currently serving the mobile station to provide the requested broadcast channel to the mobile station using the existing multicast CID, and
wherein when the requested broadcast channel is not currently being provided within the ASN, the proxy IGMP client instructs the ASN to establish a new multicast CID and issue a radio-resource request to the base station currently serving the mobile station to provide the requested broadcast channel to the mobile station using the new multicast CID.

27. The proxy IGMP client of claim 24 wherein when the mobile station is handed over from a first base station within a first ASN to a second base station within a second ASN, the proxy IGMP client temporarily extends a data path for the broadcast channel currently being received by the mobile station from the first ASN to the second ASN using tunneling to allow the mobile station to receive the broadcast channel from the second base station within the second ASN using a same multicast connection identifier (CID) used within the first ASN,
wherein the data path is temporarily extended when the second ASN is not providing the broadcast channel, and wherein the proxy IGMP client refrains from temporarily extending the data path when the second ASN is currently providing the broadcast channel, and the multicast broadcast server provides the broadcast channel to the mobile station on a multicast CID currently being used for the broadcast channel by the second ASN.

28. The network of claim 27 wherein after temporarily extending the data path, the multicast broadcast server sends a relocation response message that includes the multicast IP address of the broadcast channel to the second ASN to the first ASN, wherein in response to the relocation response message, the second ASN sends and IGMP-join message to the MBS server indicating the multicast IP address to allow the second ASN to receive the broadcast channel from the MBS server and provide the broadcast channel to the mobile station, and wherein the second ASN creates a new multicast CID for providing the broadcast channel to the mobile station and terminates the temporarily extended data path.

\* \* \* \* \*

UNITED STATES PATENT AND TRADEMARK OFFICE
CERTIFICATE OF CORRECTION

| | | |
|---|---|---|
| PATENT NO. | : 7,852,794 B2 | Page 1 of 1 |
| APPLICATION NO. | : 11/625451 | |
| DATED | : December 14, 2010 | |
| INVENTOR(S) | : Muthaiah Venkatachalam | |

It is certified that error appears in the above-identified patent and that said Letters Patent is hereby corrected as shown below:

In column 8, line 55, in Claim 1, delete "IGMP join" and insert -- IGMP-join --, therefor.

In column 8, line 65, in Claim 2, delete "IGMP join" and insert -- IGMP-join --, therefor.

In column 9, line 19, in Claim 5, delete "where in" and insert -- wherein in --, therefor.

In column 10, line 14, in Claim 13, delete "and" and insert -- an --, therefor.

In column 10, line 14, in Claim 13, delete "IGMP join" and insert -- IGMP-join --, therefor.

In column 10, line 43, in Claim 16, delete "IGMP join" and insert -- IGMP-join --, therefor.

In column 11, line 8, in Claim 18, delete "IGMP join" and insert -- IGMP-join --, therefor.

In column 11, line 53, in Claim 21, delete "and" and insert -- an --, therefor.

In column 11, line 53, in Claim 21, delete "IGMP join" and insert -- IGMP-join --, therefor.

In column 11, line 65, in Claim 23, delete "(JUMP)" and insert -- (IGMP) --, therefor.

In column 12, line 20, in Claim 24, delete "IGMP join" and insert -- IGMP-join --, therefor.

In column 14, line 2, in Claim 28, delete "and" and insert -- an --, therefor.

Signed and Sealed this
First Day of March, 2011

David J. Kappos
*Director of the United States Patent and Trademark Office*